(No Model.) 2 Sheets—Sheet 1.
E. R. THOMASON.
APPARATUS FOR REDUCING BITUMINOUS ROCK.
No. 492,639. Patented Feb. 28, 1893.
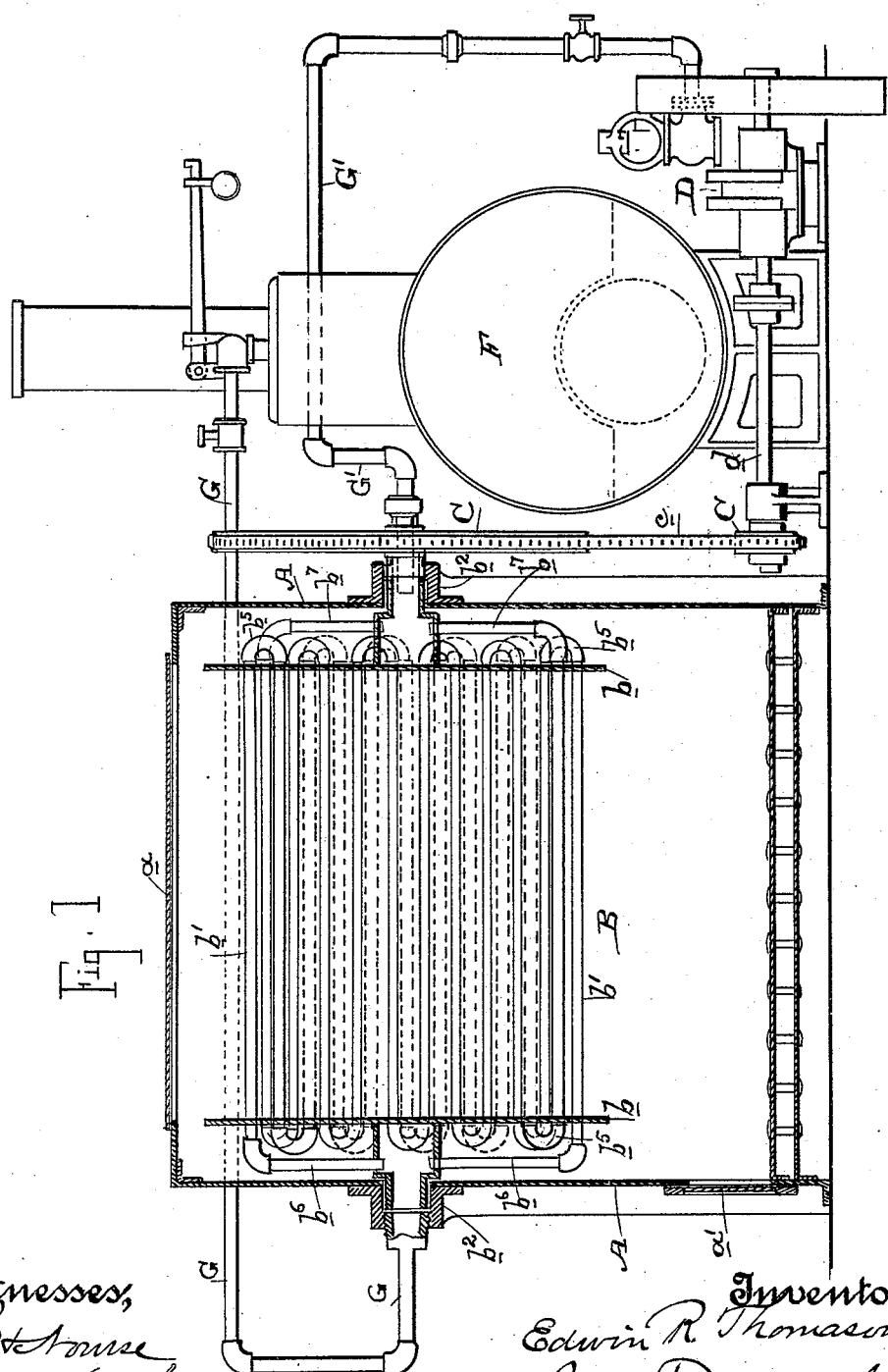

(No Model.) 2 Sheets—Sheet 2.
E. R. THOMASON.
APPARATUS FOR REDUCING BITUMINOUS ROCK.

No. 492,639. Patented Feb. 28, 1893.

Witnesses: Inventor,
Edwin R. Thomason
J. A. Bayles By Dewey & Co.
Atty

UNITED STATES PATENT OFFICE.

EDWIN R. THOMASON, OF SAN FRANCISCO, CALIFORNIA.

APPARATUS FOR REDUCING BITUMINOUS ROCK.

SPECIFICATION forming part of Letters Patent No. 492,639, dated February 28, 1893.

Application filed July 21, 1892. Serial No. 440,794. (No model.)

*To all whom it may concern:*

Be it known that I, EDWIN R. THOMASON, a citizen of the United States, residing in the city and county of San Francisco, State of California, have invented an Improvement in Apparatus for Reducing Bituminous Rock and other Asphaltum Compounds; and I hereby declare the following to be a full, clear, and exact description of the same.

My invention relates to that class of devices or machines in which the bituminous rock or other asphaltum composition is subjected to heat from suitable sources, whereby it is softened and rendered sufficiently plastic for the uses, such as paving, roofing, &c., for which it is intended.

My invention consists essentially in a rotating open work reel into which the material is introduced, and an inclosing shell or casing within which the reel is mounted.

My invention also consists in the novel construction and arrangement of said reel which I shall hereinafter fully describe and specifically point out in the claims.

The object of my invention is to provide for a thorough breaking up and disintegration of the material while undergoing reduction, whereby it is kept in a state of constant agitation and the reduced or softened portions allowed to fall away and separate from those portions not yet reduced or softened.

Figure 3:
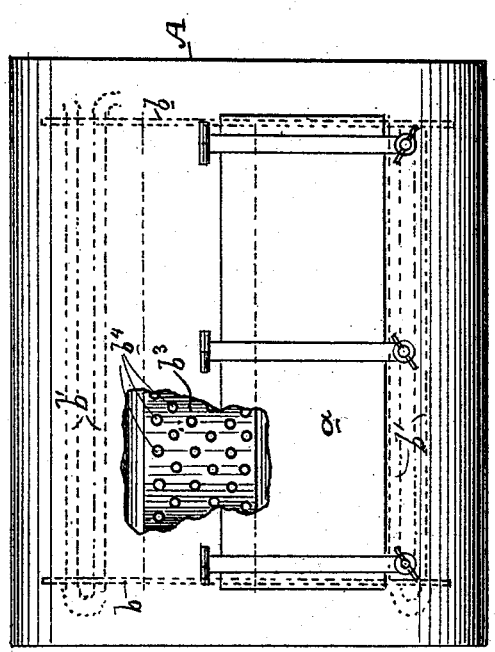
Figure 1:
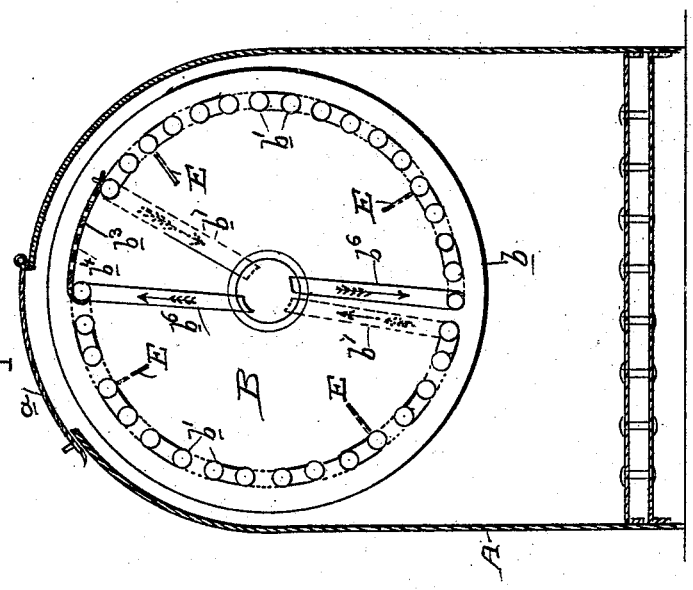

Referring to the accompanying drawings for a more complete explanation of my invention,—Figure 1 is a vertical longitudinal section of my apparatus. Fig. 2 is a vertical cross section. Fig. 3 is a plan, a portion of the outer shell being broken away, showing the door $b^3$ of the reel.

A is a casing or shell, provided at its upper portion with a feed door $a$, and at its lower portion with a discharge door $a'$. This shell may be of any suitable shape, and I have here shown it as having a rounded top and a steam jacketed or double bottom. Mounted and adapted to rotate within the upper portion of this shell is the reel B. This is an open frame-work consisting of end heads $b$ joined together by an annular series of rods or bars $b'$, solid or tubular and separated sufficiently from each other to leave interstices between them for the discharge of the material from its interior. This reel is mounted upon end bearings $b^2$ in the ends of the shell and is given a rotary motion by suitable power transmitting connections such as here shown, to wit, the chain gear C, endless chain $c$ and drive shaft $d$ of the engine D. At one portion of the circumference of this reel the connecting bars or rods are separated by a space sufficient to permit the location of a door $b^3$, said door being provided with perforations $b^4$.

The general operation of the apparatus, as thus described, is as follows:—A suitable heat from any source, as, for example, from steam is maintained within the shell or casing A. The material is fed in through the door $a$ of the casing and passes through the door $b^3$ of the reel, when said doors are in line, into the interior until the entire reel is charged. A rotary motion is then imparted to the reel and the material is thus agitated and disintegrated and broken up by the action of the bars or rods of the reel, and such portions as become sufficiently soft continually drop out through the interstices between the bars or rods and through the perforations of door $b^3$, and fall down into the bottom of the shell. These portions are thus constantly separated from the still unsoftened portions, thus allowing the heat better opportunity to reach all portions of the material and to thoroughly reduce it. From the casing it may be removed through the door $a'$. In order to assist in this operation of disintegrating and breaking up the material by the rotation of the reel I may have one or more inwardly projecting wings E extending between the ends or heads of the reel and lying in radial planes just within the rods or bars. These serve to catch and carry up the material and drop it again so that it is broken up.

Now, although as heretofore mentioned, the source of heat may be of any suitable character and I may use steam by directly introducing it into the shell or casing A, I prefer to utilize the steam by means of the following construction:—The rods or bars $b'$ are in this case made hollow or tubular, as shown, and they are so connected in the end heads of the reel as to receive steam connections from the boiler F in any suitable way to maintain a circulation of steam through them, whereby the material is softened, not by the direct contact of the steam, but by means of the heated bars and the general temperature within the casing. The arrangement of these tubes which I prefer is to connect one half of the series at each end by U-shaped couplings $b^5$ at alternate ends of said tubes, each half having an inlet connection $b^6$ with the steam pipe G from the steam dome, and an outlet connection $b^7$ with the pipe G' which leads to the engine. Thus a constant circulation of hot steam is maintained through the tubes.

Having thus described my invention, what I claim as new, and desire to secure by Letters Patent, is—

1. In an apparatus for reducing bituminous rock and other asphaltum compounds, the combination of an exterior shell or casing, a rotating reel for receiving the material mounted within said casing, and consisting of end heads and an annular series of tubes connecting said head, and steam connections with said tubes for supplying steam thereto, substantially as herein described.

2. In an apparatus for reducing bituminous rock and other asphaltum compounds by the application of heat thereto, the combination of an outer casing or shell having a feed door and a discharge, a rotating reel mounted within said casing or shell and having end heads and an annular series of separated tubes connecting said heads, and steam pipes connecting them with the tubes and supplying them with steam, substantially as herein described.

3. An apparatus for reducing bituminous rock and other asphaltum compounds, consisting of an outer shell or casing, a rotating reel for receiving the material, mounted in said shell or casing and consisting of end heads and an annular series of separated tubes connecting said heads, and steam connections with said tubes for passing steam through them, substantially as herein described.

4. An apparatus for reducing bituminous rock and other asphaltum compounds, consisting of an outer casing or shell, a rotating reel for the material, mounted within said casing or shell and consisting of end heads, and an annular series of separated tubes extending between and joining said heads, said tubes being connected at alternate ends to form one or more continuous passages, and steam connections with said passages whereby a circulation of steam is maintained through them, substantially as herein described.

5. An apparatus for reducing bituminous rock and other asphaltum compounds, consisting of a casing or shell a rotating reel mounted therein to receive the material, said reel consisting of end heads and an annular series of separated tubes connecting said heads, a boiler, the steam pipe from the boiler for supplying said tubes with steam, an engine and connections for rotating the reel, and the steam pipe from the reel tubes for leading the steam to the engine, substantially as herein described.

In witness whereof I have hereunto set my hand.

EDWIN R. THOMASON.

Witnesses:
LEE D. CRAIG,
S. H. NOURSE.